United States Patent [19]

King

[11] Patent Number: 5,054,902
[45] Date of Patent: Oct. 8, 1991

[54] LIGHT CONTROL WITH COLOR ENHANCEMENT

[76] Inventor: William J. King, 9 Putnam Rd., Reading, Mass. 01867

[21] Appl. No.: 430,080

[22] Filed: Nov. 1, 1989

Related U.S. Application Data

[63] Continuation of Ser. No. 921,312, Oct. 21, 1986, abandoned, which is a continuation of Ser. No. 223,840, Jan. 9, 1981, abandoned, which is a continuation of Ser. No. 645,262, Dec. 29, 1975, abandoned.

[51] Int. Cl.$^5$ .................... G02C 7/10; G02B 5/28; G02B 1/10
[52] U.S. Cl. ........................... 351/44; 351/163; 359/359; 359/360; 359/580; 359/589
[58] Field of Search ............. 350/164, 165, 166, 1.6; 351/44, 47, 48, 163

[56] References Cited

U.S. PATENT DOCUMENTS

| | | | |
|---|---|---|---|
| 2,373,249 | 4/1945 | Lurcott | 350/166 UX |
| 2,379,790 | 7/1945 | Dimmick | 350/166 |
| 2,394,533 | 2/1946 | Colbert et al. | 350/166 |
| 2,854,349 | 9/1958 | Dreyfus et al. | 428/333 |
| 3,011,383 | 12/1961 | Sylvester et al. | 350/166 |
| 3,472,751 | 10/1969 | King | 313/363.1 X |
| 3,679,291 | 7/1972 | Apfel et al. | 350/164 |
| 3,978,272 | 8/1976 | Donley | 350/1.7 X |
| 4,022,947 | 5/1977 | Grubb et al. | 350/1.7 X |

FOREIGN PATENT DOCUMENTS

| | | |
|---|---|---|
| 716153 | 1/1942 | Fed. Rep. of Germany . |
| J1163 | 3/1953 | Fed. Rep. of Germany . |
| 936076 | 12/1955 | Fed. Rep. of Germany . |
| 947339 | 8/1956 | Fed. Rep. of Germany . |
| 971398 | 1/1959 | Fed. Rep. of Germany . |
| 2144242 | 3/1972 | Fed. Rep. of Germany . |
| 2029181 | 5/1973 | Fed. Rep. of Germany . |
| 2334152 | 5/1975 | Fed. Rep. of Germany . |
| 41-14277Y | 7/1966 | Japan . |

OTHER PUBLICATIONS

*Scientific American*, Dec., 1970, pp. 59–75.
Book by Herbert Mayer, "Physik Dünner Schichten", Teil L. Wissenschaftliche Verlagsgesellschaft m.b.H. Stuttgart, 1950 (pp. 293–296).

*Primary Examiner*—Bruce Y. Arnold
*Assistant Examiner*—David R. Parsons
*Attorney, Agent, or Firm*—Lahive & Cockfield

[57] ABSTRACT

A semi-reflecting layer is deposited on a transparent material as part of a technique for color enhancement in such a way that the reflectivity of the semi-reflecting layer may still be varied in order to control transmission of light and portions of the electromagnetic spectrum thereto over a broad range of frequencies. For purposes of color enhancement there is used in conjunction with the semi-reflecting layer a thin dielectric layer the thickness whereof is selected to make use of optical interference between light reflected from the outer surface of the dielectric layer and light reflected from the semi-reflecting layer.

8 Claims, 5 Drawing Sheets

LIGHT CONTROL WITH COLOR ENHANCEMENT

This application is a continuation of application Ser. No. 921,312, filed Oct. 21, 1986, which is a continuation of Ser. No. 223,840, filed Jan. 9, 1981, which is a continuation of Ser. No. 645,262, filed Dec. 29, 1975, all now abandoned.

BACKGROUND OF THE INVENTION

The invention relates to the enhancement of color by means of the optical interference effects which are produced by thin films. Interference phenomena in connection with thin films are well known. A summary of some of these phenomena is set forth in an article in the Scientific American entitled "Optical Interference Coatings", December 1970, pages 59–75. Although the article starts with a display of various colors in a colored illustration and includes references to certain color effects produced in nature by thin films such as oil slicks, soap films, oyster shells, and peacock feathers, the various scientific uses of optical interference coatings described in the article do not include the conscious production of visual color effects. A major use of optical coatings is the production of reflection or non-reflection across the visible spectrum. Thus anti-reflection coatings are used on lenses, and multiple reflective coatings are used in dielectric mirrors. Applications requiring enhancement at a particular wavelength have an analytical rather than a visual purpose and require the maximum reflectivity possible, such as the laser and the Fabry-Perot interferometer. Although the Plumbicon tube separates light into primary colors, these are not viewed, but produce signals for transmission to a receiver via megacycle carrier waves. Moreover, not only do these prior scientific uses of optical interference films have no visual purpose, but the way in which the films are used to achieve a particular effect is such that, once adjusted for this effect, the optical device in question can no longer be adjusted to control other parameters.

Various methods have also been used to alter the spectral transmission and other characteristics (absorption, color etc.) of materials such as glasses or plastics in order to make them useful as sunglasses, either as light absorbers to reduce and/or control the amount and nature of light reaching the eye, or for cosmetic reasons. These methods have included coloring the basic materials, adding a colored layer over the surface, adding a neutral filter to one or more surfaces, adding a polarizing material, etc.

However, the application of interference films to provide interference colors has not normally been used for such purposes. Such colors, although observed by many investigators, have not been used in general for cosmetic purposes because of difficulties in obtaining "predetermined" colors and because the colors lacked "depth", particularly on the transparent or partly absorbing substrates that are used for sunglasses and similar purposes. It is the purpose of this invention to show how such colors can be obtained having "depth" or color "density" under controlled conditions. In addition, this invention shows that such "high depth" colors can be obtained under conditions which allow the user to control the amount and nature of light transmitted to and through the substrate. This invention will also show how the latter control of the transmitted light can also be obtained while having "low depth" coloring. In fact, any practical degree and/or combination of color depth and transmitted light control can be obtained by proper use of the present invention.

In conventional optical techniques, interference films are commonly used to fabricate band-pass light filters and to "increase" (as distinct from the invention's effect, which is always to decrease the transmitted light, as in the case of sunglasses and other light reducing devices) the amount of transmitted light (for lenses, binoculars, etc.) through their use as so-called quarter-wavelength anti-reflection filters, the latter being a simple form of the former. As discussed below, since any film of "optical" thickness $\lambda/4$ ($\lambda$ being the wavelength of the radiation) is effective only around one value of $\lambda$ (or specific functions thereof), the application of such films having $\lambda$ values in the visible range causes the reflected and transmitted light components to be colored, even when the incident light is white, as is usually the case for sunglasses, windows etc.

By choosing film thicknesses properly, one can get a wide spectrum of reflected colors (the color of the transmitted light being the spectrum of the incident light, normally white, minus the reflected and absorbed components). This technique has not normally been used as a "coloring" mechanism primarily because of difficulties in controlling the color and very importantly because of the lack of intensity or color depth when used on transparent or partly absorbing substrates. In fact, such colors are normally observed only as a necessary adjunct to other factors such as the need for an anti-reflection filter on binoculars.

The lack of color depth (pastel shading in general) is acceptable for some purposes (e.g. lightly tinted sunglasses) but is not adequate for others. Another reason why interference techniques have not been put to widespread commercial use is the need to put such films on the outside of the lens (or window etc.) for best cosmetic effect or function. In practice, this means the films themselves must be quite hard or must be covered with another harder (normally transparent) film or layer to prevent scratching or other attack, thereby complicating the manufacturing process. The use of interference films has therefore been primarily restricted to optical instruments (binoculars, spectrometers, etc.) and techniques (band pass filters, etc.) where such factors are relatively unimportant because of the care which the optical components receive and/or the undesirability of or lack of need for coloration. In fact, in many scientific instruments which use interference effects for measurement purposes, monochromatic light must be used at some stage to provide the necessary operation. For most such purposes, conventional interference techniques are adequate.

However, in the case of plastic eyeglass lenses (both prescription and sunglass) there is a need for a coloring technique which can provide vivid cosmetic colors and also give protection to the soft plastic surface while providing the light reflection and/or absorption necessary to perform a worthwhile sunglass function. Similar applications exist in plastic windows, plastic decorator panels or building materials, etc. and also for other substrate materials (e.g. glass) in special applications (decorator panels or functional windows, etc.) Other applications will be obvious to those skilled in the art who become familiar with this invention. Some of such applications may simply require a color effect without the need to adjust other parameters such as light transmission. For example, such applications as plastic wall panels protected against scratching, costume jewelry, decorative dishes, bottles, and the like may incorporate the principles of the invention simply for a coloring effect.

In these applications, the interference coloring film must usually be extremely well bonded, to a degree not normally achieved with standard deposition techniques. Although any "appropriate" process capable of attaching the required materials in the "required" form to the substrate surface may be used in applying this invention, the invention itself has been demonstrated using ion beam sputtering and ion beam implantation sputtering techniques. The former is disclosed, for example, in U.S. Pat. No. 3,472,751. The latter is disclosed in my Disclosure Document No. 032867, filed June 5, 1974, and can be used to deposit very tightly bonded, durable films on plastics and other difficult substrates, the film of deposited material commonly, but not necessarily, being harder than the substrate material.

SUMMARY OF THE INVENTION

The invention deals with transparent solids such as windows, eyeglasses, etc., (and, in certain embodiments, coloring effects on solids whether transparent or not, such as wall panels, costume jewelry, etc.) and provides means for enhancing color of light incident upon the transparent solid while at the same time permitting further control of the radiation transmitted and reflected over a wide spectrum. The invention makes use of the discovery that the color of the reflected or the transmitted light may be enhanced in a way which does not materially affect the bulk of the visible light passing through or reflected by the transparent solid. In accordance with the invention color enhancement is achieved by interference between light reflected from a semi-reflecting layer on the transparent solid and light reflected from the outer surface of a dielectric layer which is hermetically sealed over the semi-reflecting layer. The reflectivity at each of these surfaces need not be particularly large since color enhancement is achieved by a differential effect whereby the eye detects either the prominence of constructive interference at a particular band of wavelengths over the background radiation, or the color effect produced when a band-width of light is removed from the reflective light by destructive interference. In each case the bulk of the radiation is not affected by the interference phenomena, so that the light transmitted through, reflected by, or absorbed in the transparent solid may still be controlled by varying the thickness of the semi-reflecting layer and by other means.

BRIEF DESCRIPTION OF THE DRAWING

The invention may best be understood from the following detailed description thereof, having reference to the accompanying drawings, in which.

DESCRIPTION OF PREFERRED EMBODIMENTS

The primary aspect of this invention is the means of obtaining on suitable substrates, optical layers which with reflected light, i.e. to the viewer on the side of the incident light, have a "colored" metallic appearance as opposed to the conventional neutral metallic appearance normally used in sunglasses, mirrors, etc.

A second aspect is the means to obtain optical layers which control the characteristics of the visible light and/or other radiation reaching a viewer on the opposite side of the substrate from the incident visible light and/or other radiation (hereinafter collectively referred to as radiation), while simultaneously controlling the "color" of the composite structure as viewed by an observer on the side of the substrate upon which the radiation is originally incident.

A third aspect is to "control" the transmitted radiation and colors as in the second aspect above while simultaneously controlling the amount and type of incident radiation which is absorbed in the original substrate, by controlling the amount of incident radiation which is reflected away from the substrate direction.

A fourth aspect is to obtain the functions above while simultaneously protecting the underlying substrate and deposited material from mechanical and/or chemical attack.

Figure 1:
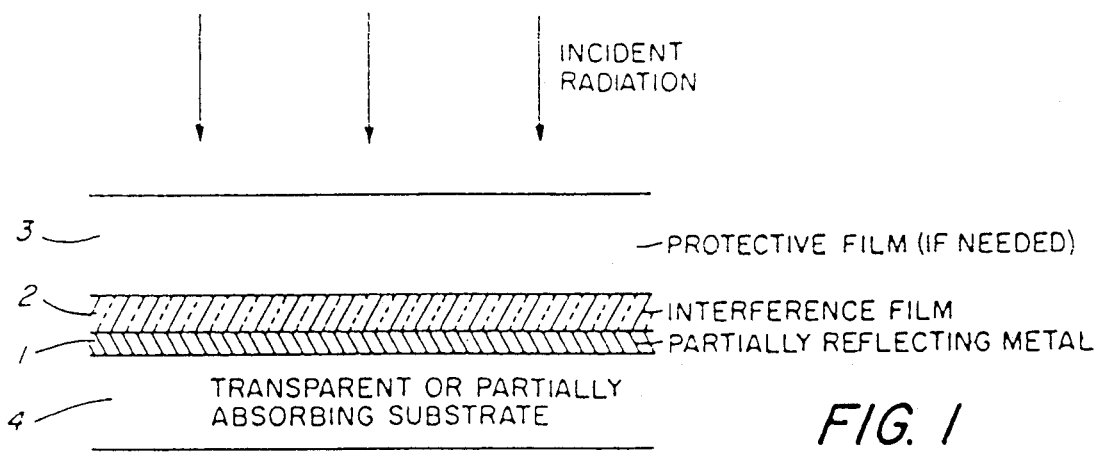
FIG. 1 is a diagrammatic sectional view of a series of layers arranged in accordance with the invention.
Figures 3A, 3B:
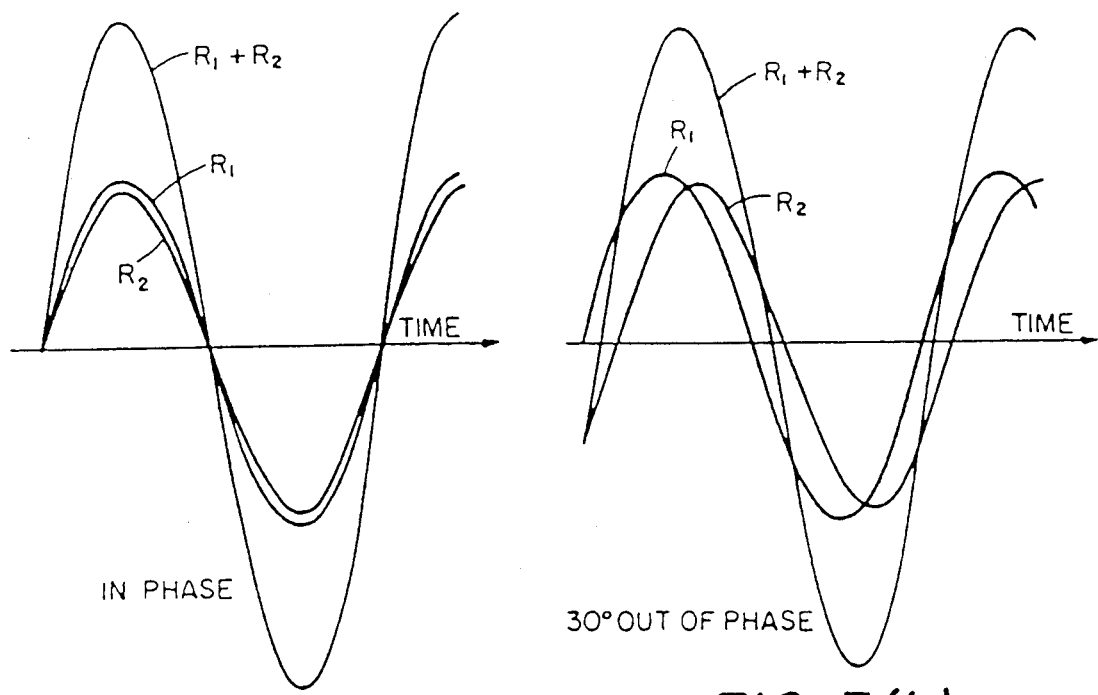
FIGS. 3(a)–3(c) are a series of graphs showing the effect of supercomposition of waves.
Figure 3C:
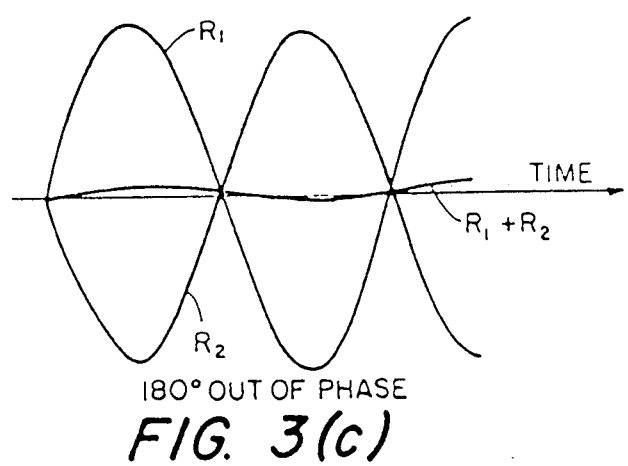
Figure 8:
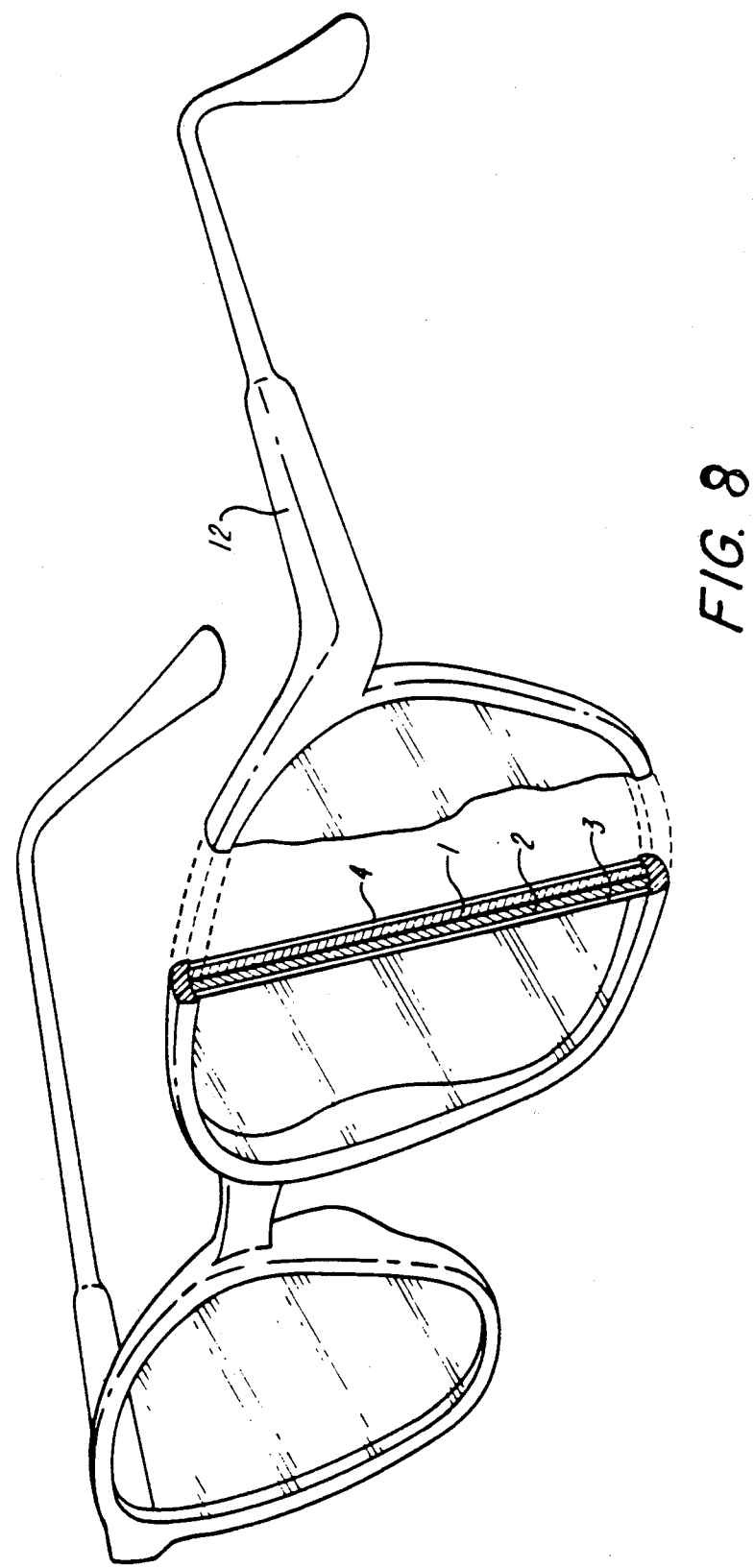
FIG. 8 is a view illustrating the lens shown in FIG. 1 within the frame of a pair of sunglasses.

The physical arrangement required in accordance with the invention to obtain all of the above functions is shown in FIG. 1. The important feature of this arrangement is the combination of a partially-reflecting or so called semi-reflecting (reflectivity being less than a highly polished or deposited "opaque" metal layer and more than a low reflectivity substrate such as clear glass or plastic) layer 1 and a layer 2 of transparent or "partially" absorbing material (such as clear or colored glass, respectively) with index of refraction and thickness appropriate to obtain the desired features of the invention. How this combination differs from conventional interference methods and how it works in practice are described below. If necessary, a second layer 3 of transparent or partially absorbing material can be put over the interference layer 2 to provide additional protection and/or coloring effects in conjunction with those due to the interference layer. The semi-reflecting layer 1 is itself supported on a suitable underlying substrate 4. FIG. 8 illustrates such an arrangement in the frame 12 of a pair of sunglasses.

The operation of this invention and the differences with respect to previous methods can best be understood by comparison with classical optical theory and practices related to interference effects due to thin films. This can be done in stages as shown in FIGS. 2–6.

The incident light may be incident at any angle $\theta$ from 0° to 90°. However, in the following discussion, unless stated otherwise the light is considered to be incident normal to the surface (i.e. $\theta=0°$) to simplify and clarify the description of the invention. The light rays in FIGS. 2, 4, 5, and 6 are shown at an angle $\theta\neq0°$ for purposes of ray identification and only the reflected rays of interest are shown. The corresponding transmitted rays are the incident rays minus the reflected component. If the substrate medium is absorbing (e.g. colored glass) the final transmitted ray would also be minus the absorbed component. Unless otherwise stated, all dielectric materials shown are non-absorbing and are assumed to have indices of refraction that are constant across the visible spectrum.

Figure 2:
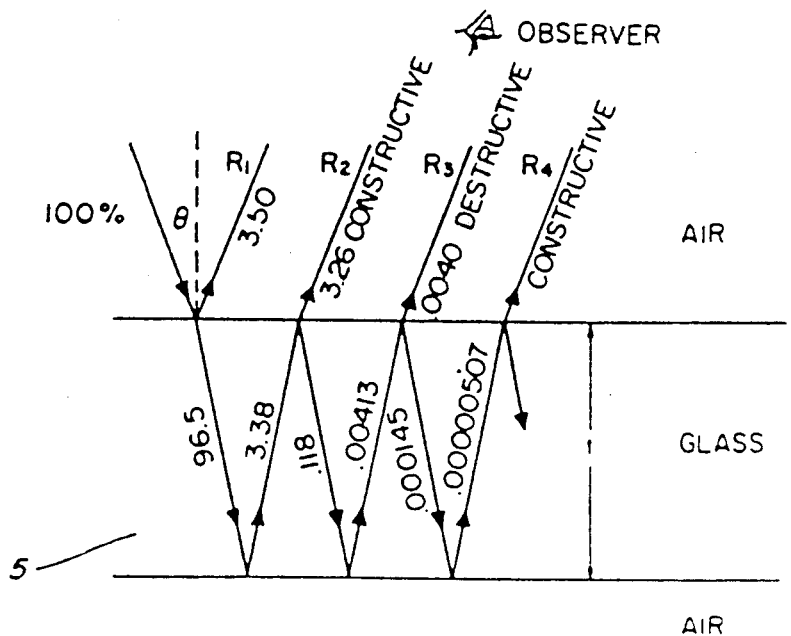
FIG. 2 is a view similar to that of FIG. 1 showing the transmission and reflection of light rays incident upon a glass layer in air.

The first element in defining the invention is a simple very thin (e.g. <10,000 Å thick) film 5 of glass suspended in an air medium as shown in FIG. 2. This is analogous to the classical soap film in which interference colors are observed corresponding to discrete film thicknesses t.

In general, there is a phase change of $\pm\pi$ if a light wave travelling in a medium with a given index of refraction is reflected at the interface with a medium having a higher index of refraction and the phase change is 0 if the reflecting medium has a lower index of refraction than the original medium. This assumption is not rigorously true for many cases of reflection at the boundary of two different media, for example at many air-metal interfaces, but is adequate and convenient for purposes of explanation. It is valid for the air-glass-air case shown in FIG. 2. Exact phase changes of 0 or $\pm\pi$ are used below in discussing all of the interfaces in FIGS. 2, 4, 5 and 6 and where this can lead to appreciable difference in operation of the invention, it is discussed. In no event does the divergence from a rigorous treatment alter the basic concepts of the invention.

Since there is a phase change of $\pm\pi$ at the first interface in FIG. 2 and 0 at the second, it can be shown that the first ray reflected from the air-glass interface is reinforced through constructive interference effects at wavelength $\lambda_c$ given by $$t = \frac{(2m + 1)\lambda_c}{4n_g \cos\theta} \quad m = 0,1,2,3 \text{ etc.} \quad (1)$$

where
t=thickness of glass
$n_g$=index of refraction of glass
$\theta$=angle of incidence
For $\theta=0$, $\cos\theta=1$ and equation (1) becomes $$t = \frac{(2m + 1)\lambda_c}{4n_g} \quad (2)$$

(All subsequent formulae and discussions assume $\theta=0$)

Reflectivity at the interface between two non-absorbing media is given by the formula $$R = \left[\frac{n_g - n_o}{n_g + n_o}\right]^2 \text{ for normal incidence} \quad (3)$$

where
$n_o$=index of refraction of first medium; in this case, air.
$n_g$=index of refraction of second medium; in this case, glass.
For $n_o=1$ (air) and $n_g=1.46$ (fused silica)
R=3.5%

Unless otherwise noted it is assumed for purposes of discussion that the reflectivity is the same at all $\lambda$'s of interest, i.e. $n_g$ is constant across the spectrum of interest.

From FIG. 2 it is seen that the component ($R_1$) reflected from the first air-glass interface has an intensity of 3.5% of the original ray. The remaining 96.5% of the original ray is reflected from the rear glass-air interface with an intensity relative to the original ray of 96.5% × 3.5% = 3.38%. At the front surface this internal ray is again reflected (reflectivity=3.5%) with an intensity relative to the original ray of 3.38% × 3.5% = 0.118% and the remaining 3.38% × 96.5% = 3.26% emerges as the second component ($R_2$).

The part of the first internal ray (0.118% of original intensity) which is rereflected at the front surface, will be reflected from the back surface with an intensity of 0.118% × 3.5% = 0.00413% and will emerge through the front surface as $R_3$ having an intensity of 0.00413% × 96.5% = 0.0040% after an additional 3.5% loss through reflection at the front surface. The internal reflections continue with corresponding decreases in the intensity of the rays $R_4$, $R_5$... emerging through the front surface. If the first internally reflected ray $R_2$ is in phase with the originally reflected ray $R_1$ upon emerging as given by equation (3), the second internally reflected ray ($R_3$ after emerging) is out of phase since the total additional path length is a $\frac{1}{2}$ integral number of wavelengths long and there is no additional phase change at either the front or rear internal reflections. The third internally reflected ray ($R_4$ after emerging) is in phase etc.

$R_1$ and $R_2$ are in phase and of much larger magnitude than the other rays, resulting in an enhancement of the color at the particular wavelength involved (assuming glass thickness t corresponding to constructive interference at visible wavelengths $\lambda_c$). A rough approximation is a doubling of the energy reflected at $\lambda_c$ as given by equation (3) and shown (for the first two rays $R_1$ and $R_2$) in FIG. 3(a). At other wavelengths near the coherent wavelength, the amplitudes can be partially reinforced as in FIG. 3(b) where it is assumed that $R_2$ is roughly 36° out of phase with $R_1$. If, however, $R_1$ and $R_2$ are $\pi$ or near $\pi$ out of phase as in FIG. 3(c), there can be almost complete annihilation of the reflected components at that wavelength. The wavelengths $\lambda_D$ for maximum out of phase destructive interference is given by:

$$t = \frac{m\lambda_D}{2n_g} \quad m = 1,2,3 \text{ etc.} \quad (4)$$

Whether major constructive and destructive interference effects can occur simultaneously in the same film and to what extent is primarily a function of the film thickness and is discussed below.

The net result with respect to the film is an apparent color corresponding to wavelengths around $\lambda_c$ (if constructive interference dominates) or at that color that remains after that corresponding to wavelengths around $\lambda_D$ are removed (if destructive interference dominates). These colors for this type of film can be reasonably intense if the film is not exposed to a lot of white light incident on the rear surface. Since the transmitted light is the complement of the reflected light, if there were white light incident on the rear surface of intensity level 100% of that incident on the front surface, the two wave trains would tend to complement each other and produce white light as viewed from either side.

However, if most of the light is incident on the front surface, the "differential" effect on the reflected light can be quite significant leading to relatively intense coloring. For example, if only constructive interference occurs, those wavelengths near $\lambda_C$ will have an intensity level of $R_1 + R_2 - R_3 + R_4$ etc. $\equiv I_c \approx R_1 + R_2 = 3.5 + 3.26 = 6.76\%$ while those at wavelengths far removed from $\lambda_c$, where $R_2$ is half in phase and half out of phase with $R_1$ will have an intensity $I_B$ roughly equal to that of $R_1$, i.e. approximately 3.5%. A convenient measure of the differential level of the constructive color component above background is the difference between the enhanced intensity $I_c$ and the random background intensity $I_B$, divided by the random background intensity $I_B$. For the case under consideration this is approximately $$\text{Differential level} \equiv \frac{I_c - I_B}{I_B} = \frac{6.76 - 3.5}{3.5} = .93 \text{ or } 93\%$$

if only the reflected components are considered. In practice, some white light is incident on the rear surface and the differential effect is much less than this.

It should be noted that the structure shown in FIG. 2, although producing vivid coloring, is not adequate for most practical purposes because of the thinness of the glass layer involved.

It should also be noted that the coloring effects are due to the ability of the eye to observe and evaluate the "relative" amplitudes of the various components of the light entering the eye, that the greater the differential height of the coherent $\lambda_C$ (for example above) "above background", the deeper or more vivid will be the apparent color.

Although the above discussion consists primarily of an analysis of observed facts and in that sense is trivial, it is important to a clear understanding of the present invention as discussed below.

Figure 4:
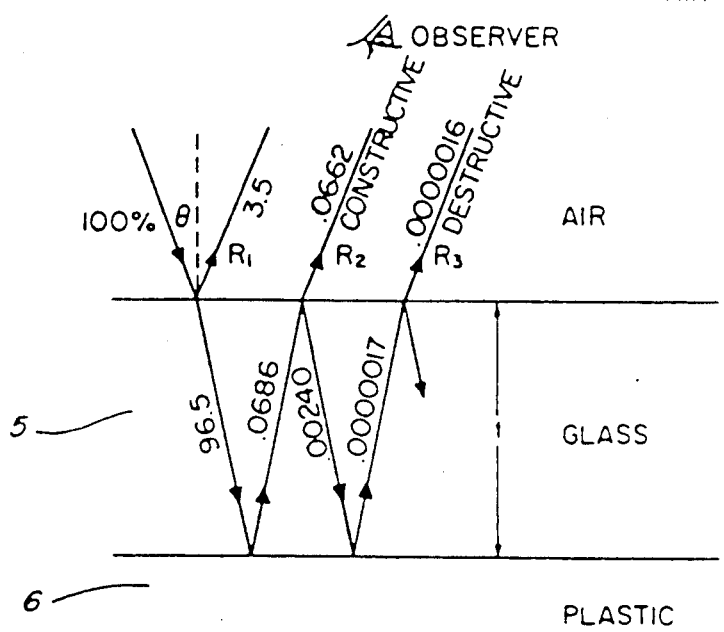
FIG. 4 is a view similar to that of FIG. 2 wherein the glass layer is supported upon a plastic substrate.

FIG. 4 gives the next stage in understanding the invention and shows a glass film 5 of index of refraction $n_g$ intimately attached by some method to a plastic substrate material 6 having index of refraction $n_p$ where $n_p \gtrsim n_g$ and both media are non-absorbing. (The materials chosen here and in subsequent stages of the development are arbitrary and could be replaced with other "suitable" materials without altering the basic explanation.) In this case there is a phase change of $\pm \pi$ upon reflection at the front surface and "another" phase change of $\pm \pi$ upon reflection at the glass-plastic interface.

The condition for constructive interference of the first internally reflected ray $R_2$ with the initial reflected ray $R_1$, in this case is given by;

$$t = \frac{m\lambda_C}{2n_g} \quad m = 1, 2, 3 \text{ etc.} \tag{5}$$

The condition for destructive interference is given by;

$$t = \frac{(2m + 1)\lambda_D}{4n_g} \quad m = 0, 1, 2, \text{ etc.} \tag{6}$$

However, in this case the amount of light reflected from the glass-plastic interface, as given by equation (3) for $n_g = 1.46$ and $n_p = 1.54$ (plastic) is only $0.071\% \times 96.5\% = 0.0686\%$ of the incident light with the emerging component $R_2$ only $0.0686\% \times 96.5\% = 0.0662\%$. The plastic substrate 6 is assumed to be very thick since it must provide support, and so there are no interference effects due to reflection at the rear plastic-air interface. This additional light of $R_2$, even if satisfying equation (5), will therefore produce a differential effect of only $0.066/3.5 = 0.019$ or 1.9% above background. Such combinations of materials therefore have only a very slightly observable coloring. In such a case white light penetrating from the back surface also tends strongly to wash out any net coloration since almost all of the white light incident on the back surface will emerge from the front as white light, raising the background level to approximately 100%.

It should be noted that in this case, if $R_1$ and $R_2$ are in phase, $R_3$ will be out of phase; i.e. will destructively interfere with $R_1$ and $R_2$ because of the additional $\pm \pi$ phase change at the second reflection at the glass-plastic interface. The additional path length in the glass is, of course, an integral number of wavelengths since that is the condition for the first internally reflected ray $R_2$ to be in phase with $R_1$. The third internally reflected ray $R_4$ is in phase, and the fourth $R_5$ out of phase etc. This factor is unimportant for the case shown in FIG. 4 because of the small reflectivities and intensities involved, but is important in the new elements involved in the present invention.

Figure 5A:
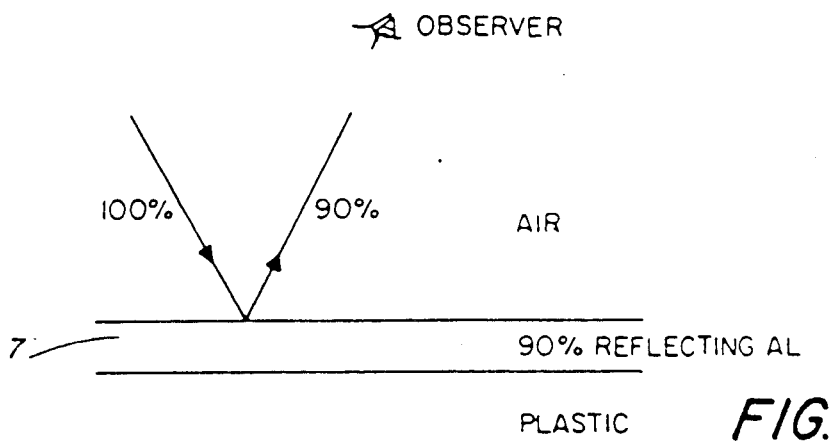
FIGS. 5(a)–5(b) are a series of views similar to that of FIG. 2 showing the reflection of light rays incident upon a highly reflective layer.

Next consider a simple highly polished opaque reflecting metal layer 7 as in FIG. 5(a) (e.g. vacuum deposited Al on glass) with a reflectivity assumed for discussion to be 90% (normally higher) and flat across the visible spectrum. The reflectivity for such an opaque absorbing medium with light incident from a dielectric of index of refraction $n_o$ is given by:

$$R = \frac{(n_o - n_m)^2 + k_m^2}{(n_o + n_m)^2 + k_m^2} \tag{7}$$

where
$n_m \equiv$ index of refraction of metal
$k_m \equiv$ extinction coefficient for metal
which reduces to $$R = \frac{(1 - n_m)^2 + k_m^2}{(1 + n_m)^2 + k_m^2} \quad \text{for } n_o = 1(\text{air}) \tag{8}$$

For some metals such as Al where the relative values of $n_m$ and $k_m$ are appropriate across the spectrum (visible) the reflectivity remains fairly flat and the reflected light has a neutral gray pure metallic appearance. For other metals such as Cu, the relative values of $n_m$ and $k_m$ are such that R varies across the visible spectrum (e.g. for evaporated Cu, $R \approx 58\%$ at 4,500 Å and $R \approx 96\%$ at 7,000 Å). For the example given, the Cu therefore appears by reflected light to be reddish since more of the red end of the spectrum is reflected. As discussed later, this factor is also used in controlling coloration using the present invention.

Returning to FIG. 5(a) the situation is quite simple with only those rays reflected from the first surface being viewed by the observer (i.e. a simple front surface mirror). If, however, the metal is covered by a thin layer (such as that shown at 8 in FIG. 5(b)) of glass, or other appropriate medium, the situation changes to that shown in FIG. 5(b) where again the "initial" reflected ray is only 3.5% of the incident energy. A phase change of $\pm\pi$ is assumed at the glass-metal interface. In a more rigorous treatment the phase change $\rho$ is given by:

$$\rho = \tan^{-1} \frac{2n_g k_m}{n_g^2 - n_m^2 - k_m^2} \qquad (9)$$

where the symbols have the meanings previously given. For many glass-metal combinations $\rho$ is near $\pi$, while for others it can vary by significant factors. This divergence from an exact $\pi$ phase change on reflection has little effect on the present invention since its effect is to slightly shift the value of the thickness t required for constructive or destructive interference at a given wavelength, through the addition of an error factor viz. (for constructive interference)

$$t = \frac{m\lambda_c}{2n_g} + \Delta t_\rho \qquad (10)$$

In practising the invention, as discussed below, one simply adjusts t to compensate for the $\Delta t_\rho$ error (if significant). A similar correction exists for variations in reflectivity but is of no consequence to the present invention since it is basically an angle of incidence correction to reflectivity and we are primarily concerned with normal incidence. As shown by equation (1) and similar formulae, constructive and destructive interference coloring effects will be apparent at non-normal angles of incidence which will vary from those at normal incidence, but this has no effect on the practice of the invention.

Figure 5B:
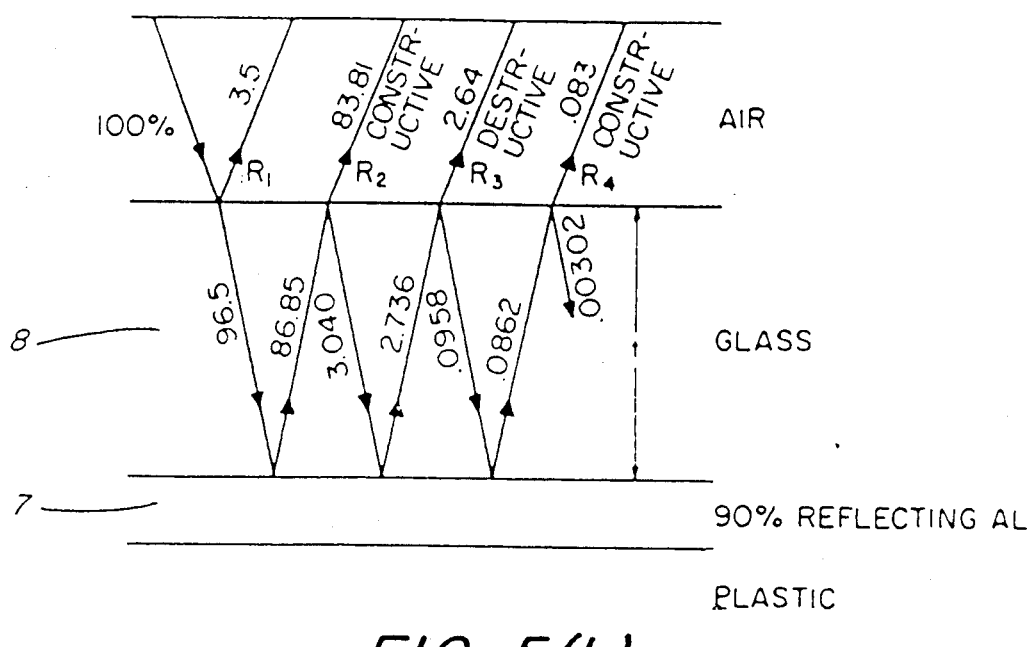

Referring to FIG. 5(b), for a phase change of $\pm\pi$, the first internally reflected ray $R_2$ is in phase with $R_1$ at $\lambda_c$ given by equation (5) and has an intensity of $(100-3.5)\% \times 90\% \times (100-3.5)\% = 96.5\% \times 90\% \times 96.5\% = 83.81\%$ of the original intensity. $R_3$ is cut of phase with $R_1$ and $R_2$ and has an intensity of $96.5\% \times 90\% \times 3.5\% \times 90\% \times 96.5\% = 2.64\%$. $R_4$ is in phase with an intensity cf $96.5\% \times 90\% \times 3.5\% \times 90\% \times 3.5\% \times 90\% \times 96.5\% = 0.083\%$. The sum of $R_1$, $R_2$, $R_3$ and $R_4$ (ignoring higher components) is therefore $$3.5 + 83.81 - 2.64 + 0.083 = 84.75\%$$

One cannot readily state what the reflected amplitudes are for wavelengths other than the coherent value since they depend critically on wavelength, materials etc. However, in general, considering $R_2$ as the primary ray because of its intensity, $(R_1 + R_4)$ and $R_3$ will tend to cancel because of the corresponding phase: differences so that the intensity variation cannot be greater than approximately $$83.81 \pm [(3.50 + 0.083) - 2.64] = 84.75 \text{ to } 82.87$$

As a rough approximation, the maximum "differential" effect is given by the value for $\lambda_c$ minus the lowest value above, i.e. $I_c = 84.75$, $I_B = 82.87$ and $$\text{Differential level} = \frac{I_c - I_B}{I_B} = \frac{84.75 - 82.87}{82.87} = .023 \text{ or } 2.3\%$$

A special case can occur if the thickness t is such (see later discussion) that destructive interference at $\lambda_D$ can occur simultaneously with constructive interference at $\lambda_c$. Should such occur, $R_2$, $R_3$ and $R_4$ for $\lambda_D$ are all in phase with each other and out of phase with $R_1$ since each additional internal reflection traversal adds $2\pi$ to the phase (additional half wavelength due to path length plus $\pi$ phase change at glass-metal interface). The amplitude for this value of $\lambda_D$ is given by $$(83.81 + 2.64 + 0.083) - 3.5 = 83.03\%$$

which gives less than the maximum differential effect calculated above for "random" wavelengths. Interference colors on such highly reflecting metal surfaces therefore tend to be weak or washed out to the eye because of the small differential intensities involved.

With the foregoing as background, the operation of the present invention may be readily understood. Consider the situation shown in FIG. 6(a) where the arrangement is the same as that in FIG. 5(b) except that the metal layer 9 is only 20% reflecting (again assumed flat across the visible spectrum). For a thickness t corresponding to constructive interference at $\lambda_c$, the intensities and phases of the reflected rays are $R_1 = 3.5\%$ (initial), $R_2 = 18.62\%$ (constructive), $R_3 = 0.13\%$ (destructive) with the higher orders being insignificant. The total reflected intensity at $\lambda_c$ is therefore $$3.5 + 18.62 - 0.13 = 22\%$$

In general, for other "normal" wavelengths the effects of $R_1$ and $R_3$ may be approximated (considering $R_2$ as the main reflected ray) by assuming that they will add half their difference in intensity to $R_2$ (i.e. $\frac{1}{2}(3.5 - 0.13) = 1.69\%$) so that the total intensity $R_1 + R_2 + R_3$ may be estimated as $18.62 + 1.69 = 20.31$. The differential effect for $\lambda_c$ above these wavelengths is therefore $$\frac{22.0 - 20.31}{20.31} = .083 = 8.3\%$$

compared to the ~2.2% found for the opaque reflecting metal case shown in FIG. 5(b). More importantly, if a simultaneous destructive interference occurs at $\lambda_D$ at the same value of t, the minimum amplitude is given by $(R_2 + R_3) - R_1$ or $$(18.62 + 0.13) - 3.50 = 15.25\%$$

In this case the differential effect $$= \frac{22 - 15.25}{15.25} = .44$$

or 44% above background which is roughly 20 times that found for the opaque reflecting metal (90%) situation in FIG. 5(b).

Figure 6A:
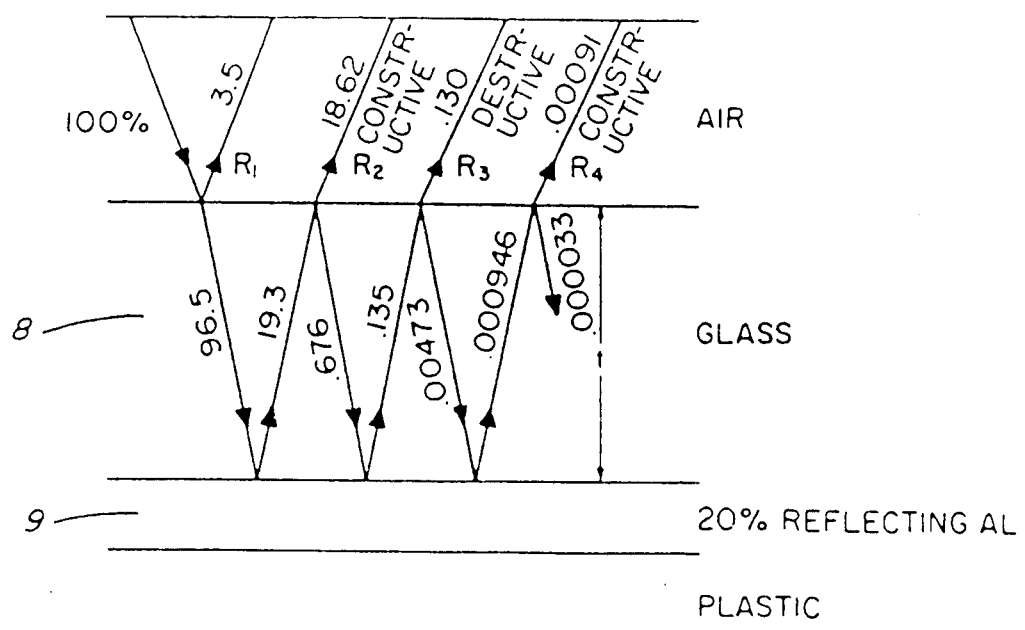
FIGS. 6(a)–6(b) are a series of views similar to those of FIG. 5 showing the reflection of light rays incident upon a semi-reflecting layer in accordance with the invention.
Figure 6B:
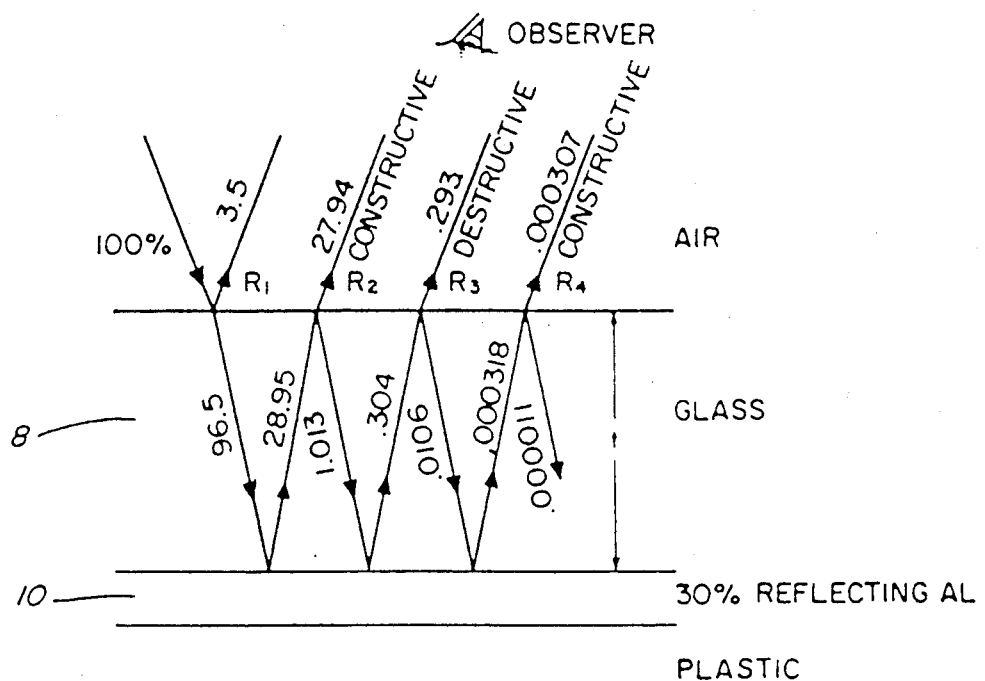

For comparison, FIG. 6(b) shows the values for a 30% reflecting layer 10. In this case the intensity at $\lambda_c$ is given by $(R_1 + R_2) - R_3$. Since $R_1 = 3.5\%$, $R_2 = 96.5\% \times 30\% \times 96.5\% = 27$ 94% and $R_3 = 96.5\% \times 30\% \times 3.5\% \times 30\% \times 96.5\% = 0.29\%$, then the intensity is $$3.50 + 27.94 - .29 = 31.15\% \text{ at } \lambda_c;$$
$$27.94 + 1/2(3.5 - .29) = 29.54\% \text{ for an average}$$
$$\text{noncoherent } \lambda_A; \text{ and}$$

-continued $$(27.94 + .29) - 3.50 = 24.75\% \text{ for a destructively interfering } \lambda_D.$$

The differential effects are therefore $$\approx \frac{31.15 - 29.54}{29.54} \times 100 = 5.45\% \text{ for } \lambda_c \text{ above } \lambda_A \text{ and}$$

$$\approx \frac{31.15 - 24.73}{24.73} \times 100 = 25.96\% \text{ for } \lambda_c \text{ above } \lambda_D$$

These are considerably smaller than for the 20% reflecting layer case but are still much larger than the $\approx 2.2\%$ found for the 90% reflecting case or for the simple glass on plastic case.

One of the basic elements of this invention is therefore the adjustment of the thickness of the dielectric medium (glass in examples) used as an interference layer, and the reflectivity of the semi-reflecting metal layer to enhance and/or optimize the differential coloring effect. If one goes to reflectivities less than 20% the effect is enhanced still more, with, for example, the differential effect (both $\lambda_c$ and $\lambda_D$ occurring simultaneously) being >100 at 10% reflectivity. At higher reflectivities than 30%, the effect, of course, decreases in intensity.

Figure 7:
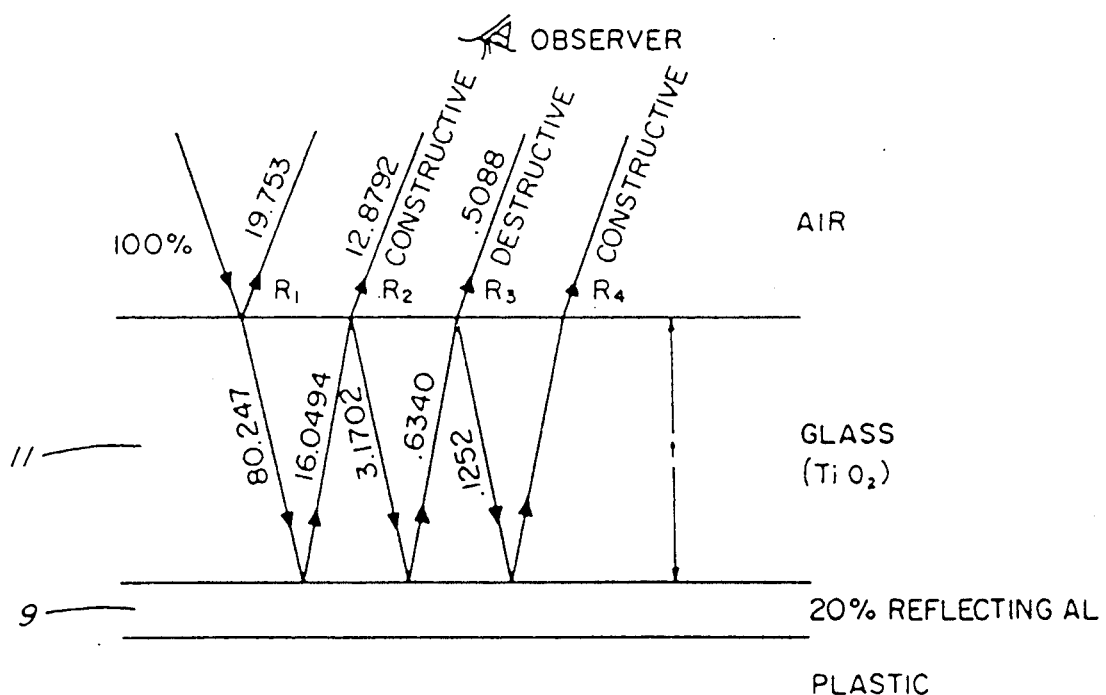
FIG. 7 is a view similar to those of FIG. 6 wherein glass of a relatively high index of refraction is used.

In examples given, SiO$_2$ (n=1.46) has been used as the interference dielectric since this material has been extensively used in demonstrating the invention. The differential effect can be increased still further, however, by using other dielectrics having higher values of n, thereby affecting the reflectivities (particularly at the front surface) and ultimately the differential effect. Consider FIG. 7 which gives the situation comparable to that shown in FIG. 6(a) (20% reflecting metal) but with TiO$_2$ having n=2.60 replacing the SiO$_2$ as the interference medium. In such a case R$_1$=19.753% by equation (3), R$_3$=80.247%$\times$20%$\times$80.247%=12.8792%, and R$_3$=80.247%$\times$20%$\times$19.753%$\times$20%$\times$80.247%=0.5088%. Considering only R$_1$, R$_2$ and R$_3$ the enhanced intensity
I$_c$=(R$_1$+R$_2$)−R$_3$=(19.753+12.8792)−0.5088=32.1234 and the background intensity I$_B$=R$_1$−(R$_2$+R$_3$)=19.753−(12.8792+0.5088)=6.3650. The maximum differential effect is given by $$\frac{I_c - I_B}{I_B} = \frac{32.1234 - 6.3650}{6.3650} = 405\%$$

which is nearly a factor of 10 greater than in the 20% reflecting SiO$_2$ dielectric case. One could therefore reduce the reflectivity of the metal even more to allow much more of the light to penetrate to the inside while still maintaining a very strong coloring effect. (The limiting factor will be the increased reflectivity at the glass plastic interface as the metal is made less dense and the relative index of the glass and plastic becomes larger leading to increased reflectivity. Exact values depend on a given application and materials). The maximum effects, of course, exist when the sum of R$_1$ and R$_2$ is much greater than their difference as in the above TiO$_2$ case. In general, this occurs when the index of refraction of the dielectric has a relatively (compared to SiO$_2$) high value. Another example is Si$_3$N$_4$ which has n=2.03 resulting in a maximum differential effect of 503%. Other materials such as SiO (n=1.95) and Al$_2$O$_3$ (n=1.76) will have coloring effects which are more pronounced than those of SiO$_2$ and others will be apparent to those skilled in the art. The choice of material depends on the particular application. In the discussions which follow, the SiO$_2$ situation is the one which is considered in all cases.

For the non-opaque, semi-reflecting metal cases, white light incident upon and penetrating through the rear surface and emerging through the front tends to decrease the effect. The major decrease is due to an increase in the background level since interference effect that occur in the thin glass layer (i.e. interference effects between light reflected at plastic-metal interface and that reflected at glass-air interface) will be non-coherent with those occurring due to light incident on the front and even if occurring will have a much smaller effect due to the much higher background. The latter results because the transmitted light differential effect is the complement of the reflected light effect and is superimposed on a much higher background (80% of light reaching plastic-metal interface minus 3.5% reflected at glass-air interface).

Considering only the increase in background, if white light of intensity 100% of I (intensity of white light on front surface) is incident on the rear surface in the 20% reflectivity (metal) case, approximately 74.5% (after three reflective losses at various interfaces) will exit through the front surface. The effect in the maximum differential case ($\lambda_c+\lambda_D$ simultaneously) is a reduction from 44% to a value of $$\frac{22.0 - 15.24}{15.24 + 74.5} = .075 \text{ or } 7.5\%$$

Although in a practical embodiment of the invention (e.g. use as sunglasses) there is much less than 100% of I coming through the rear surface, even in the worst case of 100% of I the differential effect is much greater than that obtained ($\sim$2.2%) for a 90% reflecting layer case. This negative effect of white light penetrating through the rear surface can be partly negated by having the substrate (plastic in example) made of visible light absorbing material. If, for example, the plastic in the 20% reflecting case were of a thickness and absorptivity A to be 50% absorbing in the visible, white light of intensity I entering through the rear surface would have an intensity of 0.371(1$\times$0.965$\times$0.5$\times$0.8$\times$0.965) on exiting through the front surface and the maximum differential effect ($\lambda_c+\lambda_D$ simultaneously) would be $$\approx \frac{22.0 - 15.24}{15.24 + 37} = .129 \text{ or } 12.9\%$$

In the real case of sunglass use, the light entering through the rear is much less, say 20% of I maximum, being only that going around the frames and reflected off the skin. For this value the maximum differential effect equals approximately 22% for the non-absorbing substrate use and 29.8% for the 50% absorbing substrate case.

Since the thickness t of the interference medium (glass in example), the reflectivity R of the reflecting metal, the absorptivity A of the substrate material and the ratios thereof are infinitely variable, within the limits of minimal reflectivity (no metal) and no absorption (clear substrates) and maximum reflection (opaque polished or evaporated metal) and maximum absorption (highly absorbing substrate), the color and/or intensity of the structure as viewed by an observer on the front or incident surface and that of the light reaching a viewer behind the rear surface (wearer for sunglasses) can be varied over an extremely broad range. In the practical embodiment of the invention, this allows the user to reduce the light reaching the inside viewer to a desirable level, e.g. 30% of neutral or near neutral shading for a sunglass wearer, while obtaining the desired color and intensity level for an external viewer. It has been demonstrated in practising the invention that neutral shading can be obtained by having a substrate having neutral absorption at the proper level. This can be used to overcome or wash out coloring effects due to light coming from the front surface (non-reflected) which is the complement of that reflected and is therefore colored, although of much less effective density than the reflected component because of the much higher background ($\sim 74\%$ of light being transmitted in 20% reflecting and non-absorbing substrate case). The light reaching the inside receiver can also, of course, be colored if desired.

A, R and t etc. may be adjusted to yield other values of external coloring and intensity etc. for other purposes, e.g. for office windows. For this use, in one test of the invention the absorbing substrates were of glasses manufactured by PPG Industries, Inc. under the names solarbronze, solargray and solarex. The metal layer reflectivity was adjusted to reduce the light level penetrating to the inside to a comfortable level while maintaining the neutral characteristics (particularly for solarbronze or solargray) and changing the color as viewed from the outside to that desired but for this purpose deliberately of less intensity than in the normal sunglass case. However, it should be noted that all ranges of values for external color intensity and transmitted light intensity may be used for any and all applications. Of course, in a limited number of embodiments of the invention (such as wall panels, etc.) the transmitted light intensity may be of no consequence.

A very important factor that is observed in the practical embodiment of the invention is that the colors so formed have an extremely metallic appearance; i.e. a metallic nature similar to that obtained with a highly polished metal reflector such as Al, but with deep color shading resulting in a striking "colored metallic" appearance. This occurs because the differential effect primarily results from reflection at a very thin layer in the same way that reflection results at the surface of a neutral metal reflector. The resulting radiation is therefore space as well as time coherent and the eye perceives that the light emanates from a restricted layer or layers. (This is in contrast, for example, to absorbing glasses which have a color due to absorption and reemission of radiation at many spatially separated atomic layers in the glass and which therefore do not have a metallic appearance). This factor when optimized by proper use of the present invention gives a recognizable and distinctive appearance when A, R and t etc. are chosen for vivid coloring.

The practice of the invention can best be understood and mastered by a full appreciation of the effect of using a partially-reflecting metal layer as discussed previously in conjunction with Table I which gives the colors observed by previous investigators (Pliskin and Conrad - IBM Journal, Jan. 1964) for thermally grown films of $SiO_2$ on polished (i.e. opaque maximum reflecting) slices of silicon. The latter is the case normally observed previously, where the coloration is not enhanced nor has a strong metallic appearance as in the present invention. Similar, but not exactly the same, colors were observed in the practical demonstrations of the present invention. Exact coloring depends on the metal used as the reflecting layer and varies in each case.

Table I has been prepared specifically for this invention to explain the colors obtained and to show detailed operation. It gives the calculated wavelengths for constructive interference $$\left( t = \frac{m\lambda_c}{2n_g} \right)$$

and destructive interference $$\left( t = \frac{(2m + 1)\lambda_D}{4n_g} \right)$$

in association with the colors observed by Pliskin and Conrad. Note that the value of t given is the real value, not the optical thickness $tn_g$ and the $\lambda_c$'s and $\lambda_D$'s having effects in the visible are outlined.

At 500 Å, there is no visible wavelength $\lambda_c$ or $\lambda_D$ at which interference effects should occur if the glass ($SiO_2$) has an index of refraction of $\sim 1.46$ (used for calculating Table 1). The tan color observed by Pliskin and Conrad can be explained by the following considerations. If the $SiO_2$ is oxygen deficient and has an appreciable proportion of SiO having an index of refraction of 1.95 (or other oxygen-deficient $SiO_x$ compounds) as can occur at the interface for thin thermally grown $SiO_2$ layers on Si, the $\lambda_D$ for destructive interference (m=o) is 3,900 Å which is above the edge for optical interference ($\sim 3,800$ Å) in the visible. Some of the violet component will be removed from the reflected light under these conditions, so that the remaining reflected light has a tan appearance or color as observed by Pliskin and Conrad. However, for n=1.46 which is obtained if the silicon is deposited by ion beam sputtering or ion beam implantation sputtering techniques, no tan color is apparent when layers of 500 Å thickness are deposited on highly reflective metal layers such as opaque ion beam sputtered Al on smooth glass or plastic substrates. Such layers, if hermetic as in the ion beam sputtering case, can be used to protect the reflecting metal against corrosion etc. without altering its optical characteristics at wavelengths longer than $\sim 3,000$ Å. This has been clearly demonstrated for the present invention.

If the thickness is increased to 700 Å, $\lambda_D$ becomes 4,088 Å, moving the removed (i.e. destructively interfered) component farther towards the blue, producing a brown appearance. At 1000 Å, $\lambda_D$ is 5,840 Å which is in the yellow part or middle of the spectrum. Both ends of the spectrum therefore show up in the reflected light which is dark violet to red-violet. At t=1,200 Å the red end of the spectrum is removed and the reflected light centers around the blue region. These results are confirmed by Pliskin and Conrad's observations, and one can assume that for these thicker layers the problem of oxygen deficiency at the interface is relatively less severe.

At approximately 1,300 Å thick, a new effect occurs; i.e. "constructive" interference at 3,800 Å with the first corresponding value in the table being a $\lambda_c$ of 4,380 Å for t=1,500 Å. For this value of t, the coloring is primarily due to constructive interference rather than destructive effects so the reflected light has a color (light blue) dominated by $\lambda_c$. In fact the royal blue observed at 1,200 Å probably has a constructive component in the deep violet due to the spread around $\lambda_c$ (see FIG. 3(b)) and the extension of enhancement effects to higher and lower values of $\lambda$ than the precise value $\lambda_c$.

In addition, because of the spatial as well as time coherent nature of the reflected light, it assumes a metallic appearance which is also observed at t=1,700 Å and 2,000 Å. However, these effects for opaque maximum reflecting substrates as in the Pliskin and Conrad case are very small and disappear at larger values of t, but are very prominent and continue throughout the large values of t if the present invention is practised to produce large differential effects as discussed previously.

Also beginning at t=2,000 Å is a definite simultaneous occurrence of $\lambda_c$ and $\lambda_D$. At t=2,200, $\lambda_c$=6,424 Å while $\lambda_D$=4,283 Å so the reflected light is enhanced around $\lambda_c$ and has a decreased value around $\lambda_D$, the resulting color being a combination of the two effects, or gold with slight yellow orange for this example. Using the present invention, the enhancement of the color through the differential effect plus the spatially coherent nature of the reflected light results in a "strong" metallic appearance for all colors corresponding to thicknesses greater than 1,300 Å. This metallic appearance and strong coloration continue until the thickness is such that there are so many interference effects occuring simultaneously at different $\lambda_c$'s and $\lambda_D$'s (i.e. for different values of m—see Table 1) that the resulting reflected light again tends to white (e.g. in Table 1, for t=15,400 Å, there are 6 $\lambda_c$'s corresponding to m=6, 7, 8, 9, 10 & 11 and 6 $\lambda_D$'s corresponding to m=6, 7, 8, 9, 10 and 11). Above >15,000 Å the interference colors become hard to observe on opaque maximum reflecting substrates although still easily observed on the partially-reflecting substrates of the present invention because of the color enhancement.

From Table 1, one can also see that for the values of t which would be used in practising the invention, there are values of $\lambda_c$ and $\lambda_D$ corresponding to effects in the IR (infrared) and UV (ultraviolet) regions of the spectrum. Such effects are discussed below in connection with an important variation on the invention.

Table 1 allows the user to choose the correct values of t to practise and optimize the effects of the present invention when used in conjunction with appropriate reflectivity calculations. No precise format can be given for the latter since it depends on factors (e.g. light levels, color density, means of depositing materials etc.) which must be chosen for a given application. The most enhanced colorations are obtained for one or two orders of $\lambda_c$ combined with one or two orders of $\lambda_D$ which in general applies for t between 1,500 Å and 6,000 Å. This is not rigid, since the coloration depends on other factors such as reflectivity, absorption in the substrate, type of reflecting metal etc. but serves as a guideline for easiest practice of the invention. $SiO_2$ layers of this thickness are also found to supply adequate chemical and mechanical protection for the underlying metal and/or plastic in many applications (e.g. sunglasses or windows).

Another variation which can be used to extend the range of colors obtained by the present invention is to use an absorbing dielectric medium for the interference dielectric, on the front surface. The color thus obtained is a combination of the interference effect and the absorption and reemission effects in the interference dielectric. It should also be noted that light penetrating from the rear through an absorbing substrate will affect the coloring to an extent depending on the intensity of the rear light and the color of the absorbing substrate. The latter may be used to modify the color or to "mute" the metallic effect in applications such as office building windows.

Another variation is to choose the partially-reflecting metal from those that do not have near constant reflectivity across the visible spectrum but which have varying R. An example is copper which has a reflectivity of ~58% at 4,500 Å and ~97% at 7,000 Å. This difference in reflectivity can be used further to enhance certain colors, e.g. red tones, because of their obvious enhancement of the differential effect due to the difference in reflectivity. Gold, nickel, and brass are other examples of such metals or alloys. Others will be obvious to those skilled in the art.

A most important variation of the invention is obtained by extending its application to other wavelengths outside of the visible, in particular into the infrared (IR) region. This is of special importance for windows designed to reduce or control the amount of radiant heat (from sun, atmosphere, or other hot sources such as other buildings etc.) entering the building in order to conserve energy by reducing the air conditioning load. In order to optimize this saving, it is desirable that any optical layers used to reflect or reject the incident IR radiation be on the outside surface of the window. If applied to the inside, much of the incident IR radiation will be absorbed in the glass itself, either on the first pass through or on the second pass after reflection, thereby heating up the glass. Much of this heat in the glass is then transferred into the interior of the building by convection currents of the internal air or by reradiation at longer $\lambda$'s. Applied to the outside, such reflecting layers are therefore more effective in summer but are still effective in preventing heat losses in winter since the IR energy radiated by internal objects will either be absorbed in the glass, and partially returned to the room by convection etc., or for the portion that passes through the glass to the metal layer, will be reflected back and absorbed in the glass or returned to the room.

With the present invention, this control of the IR radiation entering or leaving the inside of the building can be effected while still controlling the visible light entering the building and also the external and internal coloring effects. This capability results from the longer wavelengths of the IR radiation. By reducing the thickness of the partially reflecting metal layer, one can control the amount of visible light entering the building for lighting needs (e.g. $\approx$50% of incident light for R$\approx$20% and 40% absorbing substrate), while achieving the condition for optimizing color effects as discussed previously, and maintaining a high IR reflectivity. In demonstrating this invention, it has been demonstrated that this combination can be achieved if the partially-reflecting metal is one of inherently high IR reflectivity, which is put down by a technique or process (such as ion beam sputtering) which provides uniform dispersion of the metal without appreciable agglomeration. At thicknesses where the layer looks relatively open to visible $\lambda$'s, the same partially-reflecting layer looks relatively opaque to the IR $\lambda$'s since their size is such that they intercept more of the metal atoms on the average, leading to increased reflection.

In practice, visible reflectivities have been reduced to the 20-50% range in the visible while maintaining the IR reflectivity at >70% and as high as 95% in the near (e.g. 2.5μ) and far IR (e.g. >10μ). An important region for control of heat load on buildings is below 2.5μ for air conditioning requirements (most of heat incident from outside) since the terrestrial solar spectrum is such that approximately half of the sun's radiation is in the visible and half in the near IR (below 2.5μ). However, the buildings also receive longer wavelength (4-100 microns with maximum intensity near 10 microns) radiation from the atmosphere which also exerts a heat load. For winter conditions, where one wants to prevent radiation of heat from internal bodies with temperatures of ~25°-30° C., the far IR characteristic is important since the peak of the black body radiation spectrum for a body at 28° C. is approximately at 10μ. It is therefore desirable that the reflectivity be high across the IR spectrum. This has been demonstrated with the present invention using Cu or brass as the reflecting metal, both of which have higher reflectivity at the longer visible λ's than at the shorter end of the spectrum. The value of reflectivity can thus be adjusted to give relatively high IR reflectivity, including the region from 8,000 Å up to 2.5μ (25,000 Å) while keeping the average visible light reflectivity low. Other materials such as Au and Ag etc. may be used to achieve the desired function but are relatively expensive and for many application methods difficult to deal with.

As evident from Table 1 and discussed previously, interference effects also occur in the IR as well as in the visible for interference layers of interest for coloring effects. These interference effects in the IR are, however, of much less importance since the IR reflectivity is high (for properly chosen metal layer) with or without interference effects, and differential effects are relatively unimportant.

In demonstrating the present invention, ion beam sputtering and ion team implantation sputtering have been used. However, any process that is capable of putting down the necessary materials in the necessary form may be used without affecting the operation of the invention. The deposition technique used in demonstrating the invention can also put down materials such as Au or Ag on both glass and/or plastic as well as other materials without intermediate or bonding layers, as required with many other techniques (e.g. evaporation). This is important in achieving the correct degree of reflectivity for proper operation of the invention. More importantly, it is of utmost necessity that the glass interference layer over the metal layer protect the metal layer from chemical (environmental) and mechanical (cleaning etc.) attack as well as providing the necessary interference function. This is only possible if the glass is impervious to chemical vapors or liquids in very thin layers, is mechanically hard and is of optical quality. Ion beam sputtered fused SiO2 has been used to demonstrate the invention since it meets all of these requirements because of its unique characteristics. However, any other method of, applying the interference glass with the necessary characteristics will result in successful operation of the invention.

It is important that the glass layer be applied immediately over the metal layer and in such a manner that the metal does not oxidize or otherwise alter its reflecting state. If, for example, the metal is a freshly deposited layer of Cu, and it is exposed to air or $O_2$ for an appreciable time before the hermetic interference layer (or equivalent) is applied, the Cu will oxidize and the reflectivity will decrease, affecting the visible coloration, reflected and transmitted light intensities and IR rejection capability. If the glass is not hermetic, the characteristics of the structure will degrade with time. Au is not subject to severe degradation but is relatively expensive and for some application techniques difficult to apply.

Application of the hermetic seal immediately over the reflecting layer can be used to provide very thin (500 Å or less) non-colored protective layers if the applied glass is impervious to chemical attack in thin layers. As discussed previously, the coloration observed by Pliskin and Conrad at 500 Å may be due to inadequate characteristics of the glass layer. The use of such thin layers avoids the expense of applying thick layers (>2μ) to eliminate interference color effects. This innovation has been demonstrated and is of importance for protecting front surface mirrors while maintaining optical characteristics, for applications such as optical instrument mirrors and concentrators for energy conservation and generation systems, for hermetically sealing solar cells for terrestrial applications etc.

Another variation of the present invention is its use on plastic substrates, both absorbing and non-absorbing at visible λ's, to provide IR rejection. Whereas glass substrates, in many practical areas of interest such as sunglasses, absorb some of the incident IR, plastics in general do not. Thus wearers of plastic sunglasses are subjected to IR heating of the eye, leading to drying out of the membranes and irritation, even if the glasses are adequate for visible radiation purposes. The present invention avoids this effect through rejection of undesirable IR radiation while controlling visible light and coloring effects at desirable levels. With the metal applied as a thicker highly reflecting opaque layer, "plastics" can also be used as excellent visible plus IR mirrors and concentrators etc. for solar energy generation and conservation systems, with the metal layer protected by a thin (~500 Å) hermetic and mechanical seal as discussed previously. These effects have been demonstrated.

Still another variation of the invention is its use to produce coloring effects in wall panels, etc. without regard to transmission properties.

Having thus described the principles of the invention, together with several illustrative embodiments thereof, it is to be understood that, although specific terms are employed, they are used in a generic and descriptive sense and not for purposes of limitation, the scope of the invention being set forth in the following claims.

TABLE 1

| Color | |
| --- | --- |
| Tan | 500 |
| Brown | 700 |
| Dark Violet to Red-Violet | 1,000 |
| Royal Blue | 1,200 |
| Light Blue to Metallic Blue | 1,500 |

TABLE 1-continued

| | |
|---|---|
| Metallic to very light Yellow-Green | 1.700 |
| Light Gold on Yellow - slightly metallic | 2.000 |
| Gold with slight yellow-orange | 2.200 |
| Orange to Melon | 2.500 |
| Red-Violet | 2.700 |
| Blue to Violet-Blue | 3.000 |
| Blue | 3.100 |
| Blue to Blue-Green | 3.200 |
| Light Green | 3.400 |
| Green to Yellow-Green | 3.500 |
| Yellow-Green | 3.600 |
| Green-Yellow | 3.700 |
| Yellow | 3.900 |
| Light Orange | 4.100 |
| Carnation Pink | 4.200 |
| Violet-Red | 4.400 |
| Red-Violet | 4.600 |
| Violet | 4.700 |
| Blue-Violet | 4.800 |
| Blue | 4.900 |
| Blue-Green | 5.000 |
| Green (broad) | 5.200 |
| Yellow-Green | 5.400 |
| Green-Yellow | 5.600 |
| Yellow to "Yellowish" | 5.700 |
| Light Orange on Yellow to Pink borderline | 5.800 |
| Carnation Pink | 6.000 |
| Violet-Red | 6.300 |
| Bluish (borderline violet to bluegreen - appears greyish) | 6.800 |
| Blue-Green to Green (quite broad) | 7.200 |
| "Yellowish" | 7.700 |
| Orange (rather broad for Orange) | 8.000 |
| Salmon | 8.200 |
| Dull, light red-violet | 8.500 |
| Violet | 8.600 |
| Blue-Violet | 8.700 |
| Blue | 8.900 |
| Blue-Green | 9.200 |
| Dull Yellow-Green | 9.500 |
| Yellow to "Yellowish" | 9.700 |
| Orange | 9.900 |
| Carnation Pink | 10.000 |
| Violet-Red | 10.200 |
| Red-Violet | 10.500 |
| Violet | 10.600 |
| Blue-Violet | 10.700 |
| Green | 11.000 |
| Yellow-Green | 11.100 |
| Green | 11.200 |
| Violet | 11.800 |
| Red-Violet | 11.900 |
| Violet-Red | 12.100 |
| Carnation Pink to Salmon | 12.400 |
| Orange | 12.500 |
| "Yellowish" | 12.800 |
| SkyBlue to Green-Blue | 13.200 |
| Orange | 14.000 |
| Violet | 14.500 |
| Blue-Violet | 14.600 |
| Blue | 15.000 |
| Dull Yellow-Green | 15.400 |

| t(Å) | m=1 | 2 | 3 | 4 | 5 | $\gamma_c$ 6 | 7 | 8 | 9 | 10 | 11 |
|---|---|---|---|---|---|---|---|---|---|---|---|
| 500 | 1460 | 730 | 487 | 365 | | | | | | | |
| 700 | 2044 | 1022 | 681 | 511 | | | | | | | |
| 1000 | 2920 | 1460 | 973 | 730 | | | | | | | |
| 1200 | 3504 | 1752 | 1168 | 876 | | | | | | | |
| 1500 | 4380 | 2190 | 1460 | 1095 | | | | | | | |
| 1700 | 4964 | 2482 | 1655 | 1241 | | | | | | | |
| 2000 | 5840 | 2920 | 1947 | 1460 | | | | | | | |
| 2200 | 6424 | 3212 | 2141 | 1606 | | | | | | | |
| 2500 | 7300 | 3560 | 2433 | 1825 | | | | | | | |
| 2700 | 7884 | 3942 | 2628 | 1971 | | | | | | | |
| 3000 | 8760 | 4380 | 2920 | 2190 | | | | | | | |
| 3100 | 9052 | 4526 | 3017 | 2263 | | | | | | | |

TABLE 1-continued

| | | | | | | | | | | | |
|---|---|---|---|---|---|---|---|---|---|---|---|
| 3200 | 9344 | 4672 | 3115 | 2336 | | | | | | | |
| 3400 | 9928 | 4964 | 3309 | 2482 | | | | | | | |
| 3500 | 10220 | 5110 | 3407 | 2555 | | | | | | | |
| 3600 | 10512 | 5256 | 3504 | 2628 | | | | | | | |
| 3700 | 10804 | 5402 | 3601 | 2701 | | | | | | | |
| 3900 | 11388 | 5694 | 3796 | 2847 | | | | | | | |
| 4100 | 11972 | 5986 | 3991 | 2993 | | | | | | | |
| 4200 | 12264 | 6132 | 4088 | 3066 | | | | | | | |
| 4400 | 12846 | 6424 | 4283 | 3212 | | | | | | | |
| 4600 | 13432 | 6716 | 4477 | 3358 | 2686 | | | | | | |
| 4700 | 13724 | 6862 | 4575 | 3431 | 2745 | | | | | | |
| 4800 | 14016 | 7008 | 4672 | 3504 | 2803 | | | | | | |
| 4900 | 14308 | 7154 | 4769 | 3577 | 2862 | | | | | | |
| 5000 | 14600 | 7300 | 4867 | 3650 | 2920 | | | | | | |
| 5200 | 15184 | 7592 | 5061 | 3796 | 3037 | | | | | | |
| 5400 | 15768 | 7884 | 5256 | 3942 | 3154 | | | | | | |
| 5600 | 16352 | 8176 | 5451 | 4088 | 3270 | | | | | | |
| 5700 | 16644 | 8322 | 5548 | 4161 | 3463 | | | | | | |
| 5800 | 16936 | 8468 | 5645 | 4234 | 3387 | | | | | | |
| 6000 | 17520 | 8760 | 5840 | 4380 | 3504 | | | | | | |
| 6300 | 18396 | 9198 | 6132 | 4599 | 3679 | | | | | | |
| 6800 | 19856 | 9928 | 6619 | 4964 | 3971 | | | | | | |
| 7200 | 21026 | 10512 | 7008 | 5256 | 4205 | 3504 | 3003 | | | | |
| 7700 | 22484 | 11242 | 7495 | 5621 | 4497 | 3747 | 3212 | | | | |
| 8000 | 23360 | 11680 | 7787 | 5840 | 4672 | 3893 | 3337 | | | | |
| 8200 | | | 7981 | 5986 | 4789 | 3991 | 3421 | | | | |
| 8500 | | | 8273 | 6205 | 4964 | 4137 | 3546 | | | | |
| 8600 | | | 8371 | 6278 | 5022 | 4185 | 3587 | | | | |
| 8700 | | | 8468 | 6351 | 5081 | 4234 | 3629 | | | | |
| 8900 | | | 8663 | 6497 | 5198 | 4331 | 3713 | 3248 | | | |
| 9200 | | | | 6716 | 5373 | 4477 | 3838 | 3358 | | | |
| 9500 | | | | 6935 | 5548 | 4623 | 3963 | 3468 | | | |
| 9700 | | | | 7081 | 5665 | 4721 | 4046 | 3540 | | | |
| 9900 | | | | 7227 | 5782 | 4818 | 4130 | 3614 | | | |
| 10000 | | | | 7300 | 5840 | 4867 | 4171 | 3650 | 3244 | | |
| 10200 | | | | 7446 | 5957 | 4964 | 4255 | 3723 | 3309 | | |
| 10500 | | | | 7665 | 6132 | 5110 | 4380 | 3823 | 3407 | | |
| 10600 | | | | 7738 | 6190 | 5159 | 4422 | 3869 | 3439 | | |
| 10700 | | | | 7811 | 6249 | 5207 | 4463 | 3905 | 3472 | | |
| 11000 | | | | 8030 | 6424 | 5353 | 4589 | 4015 | 3569 | | |
| 11100 | | | | 8103 | 6482 | 5402 | 4630 | 4051 | 3601 | | |
| 11200 | | | | 8176 | 6541 | 5451 | 4672 | 4088 | 3634 | | |
| 11800 | | | | 8614 | 6891 | 5743 | 4922 | 4307 | 3828 | 3446 | |
| 11900 | | | | | 6950 | 5791 | 4964 | 4344 | 3861 | 3475 | |
| 12100 | | | | | 7066 | 5889 | 5047 | 4416 | 3926 | 3533 | |
| 12400 | | | | | 7242 | 6035 | 5173 | 4526 | 4023 | 3621 | |
| 12500 | | | | | 7300 | 6083 | 5214 | 4562 | 4055 | 3650 | |
| 12800 | | | | | 7475 | 6229 | 5339 | 4672 | 4153 | 3738 | |
| 13200 | | | | | 7709 | 6424 | 5506 | 4818 | 4283 | 3854 | 3504 |
| 14000 | | | | | 8176 | 6813 | 5840 | 5110 | 4542 | 4088 | 3716 |
| 14500 | | | | | 8468 | 7057 | 6049 | 5292 | 4704 | 4234 | 3849 |
| 14600 | | | | | | 7105 | 6090 | 5329 | 4737 | 4263 | 3876 |
| 15000 | | | | | | 7300 | 6257 | 5475 | 4867 | 4380 | 3982 |
| 15400 | | | | | | 7495 | 6424 | 5621 | 4996 | 4497 | 4088 |

$\gamma_D$

| t(Å) | m=0 | 1 | 2 | 3 | 4 | 5 | 6 | 7 | 8 | 9 | 10 | 11 |
|---|---|---|---|---|---|---|---|---|---|---|---|---|
| 500 | 2920 | 973 | 584 | 417 | | | | | | | | |
| 700 | 4088 | 1363 | 818 | 584 | | | | | | | | |
| 1000 | 5840 | 1947 | 1168 | 834 | | | | | | | | |
| 1200 | 7008 | 2336 | 1402 | 1001 | | | | | | | | |
| 1500 | 8760 | 2920 | 1752 | 1251 | | | | | | | | |
| 1700 | 9928 | 3309 | 1986 | 1418 | | | | | | | | |
| 2000 | 11680 | 3893 | 2336 | 1664 | | | | | | | | |
| 2200 | 12848 | 4283 | 2570 | 1835 | | | | | | | | |
| 2500 | 14600 | 4867 | 2920 | 2086 | | | | | | | | |

TABLE 1-continued

| | | | | | | | |
|---|---|---|---|---|---|---|---|
| 2700 | 15768 | 5256 | 3154 | 2253 | | | |
| 3000 | 17520 | 5840 | 3504 | 2503 | | | |
| 3100 | 18104 | 6035 | 3621 | 2586 | | | |
| 3200 | 18688 | 6229 | 3738 | 2670 | | | |
| 3400 | 19856 | 6619 | 3971 | 2837 | | | |
| 3500 | 20440 | 6813 | 4088 | 2920 | | | |
| 3600 | 21024 | 7008 | 4205 | 3003 | | | |
| 3700 | 21608 | 7203 | 4322 | 3087 | | | |
| 3900 | 22776 | 7592 | 4555 | 3254 | | | |
| 4100 | 23944 | 7981 | 4789 | 3421 | | | |
| | | | | | | | |
| 4200 | 24528 | 8176 | 4906 | 3504 | 2725 | | |
| 4400 | 25696 | 8565 | 5139 | 3671 | 2855 | | |
| 4600 | 26864 | 8955 | 5373 | 3838 | 2985 | | |
| 4700 | 27448 | 9149 | 5490 | 3921 | 3050 | | |
| 4800 | 28032 | 9344 | 5606 | 4005 | 3115 | | |
| 4900 | 28616 | 9539 | 5723 | 4088 | 3180 | | |
| 5000 | 29200 | 9733 | 5840 | 4171 | 3244 | | |
| 5200 | | 10123 | 6074 | 4338 | 3374 | | |
| 5400 | | 10512 | 6307 | 4505 | 3504 | | |
| 5600 | | 10901 | 6541 | 4672 | 3634 | 2973 | |
| | | | | | | | |
| 5700 | | 11096 | 6658 | 4755 | 3699 | 3026 | |
| 5800 | | 11291 | 6774 | 4839 | 3764 | 3079 | |
| 6000 | | 11680 | 7008 | 5006 | 3893 | 3185 | |
| 6300 | | 12264 | 7358 | 5256 | 4088 | 3345 | |
| 6800 | | 13237 | 7942 | 5673 | 4412 | 3610 | |
| 7200 | | 14016 | 8410 | 6007 | 4672 | 3823 | 3234 |
| 7700 | | 14989 | 8994 | 6424 | 4996 | 4088 | 3459 |
| 8000 | | 15573 | 9344 | 6674 | 5191 | 4247 | 3594 |
| 8200 | | | | 6841 | 5321 | 4354 | 3684 |
| 8500 | | | | 7091 | 5516 | 4513 | 3818 | 3309 |
| | | | | | | | |
| 8600 | | | | 7175 | 5580 | 4566 | 3863 | 3348 |
| 8700 | | | | 7258 | 5645 | 4619 | 3908 | 3387 |
| 8900 | | | | 7425 | 5775 | 4725 | 3998 | 3465 |
| 9200 | | | | 7675 | 5970 | 4884 | 4133 | 3582 |
| 9500 | | | | 7925 | 6164 | 5044 | 4268 | 3699 |
| 9700 | | | | 8093 | 6294 | 5150 | 4358 | 3777 |
| 9900 | | | | 8259 | 6424 | 5256 | 4447 | 3854 | 3401 |
| 10000 | | | | | 6489 | 5309 | 4492 | 3893 | 3435 |
| 10200 | | | | | 6619 | 5415 | 4582 | 3971 | 3504 |
| 10500 | | | | | 6813 | 5575 | 4717 | 4088 | 3607 |
| | | | | | | | |
| 10600 | | | | | 6878 | 5628 | 4762 | 4127 | 3641 |
| 10700 | | | | | 6943 | 5681 | 4807 | 4166 | 3676 |
| 11000 | | | | | 7138 | 5840 | 4942 | 4283 | 3779 |
| 11100 | | | | | 7203 | 5893 | 4986 | 4322 | 3813 |
| 11200 | | | | | 7268 | 5946 | 5031 | 4361 | 3848 | 3443 |
| 11800 | | | | | 7657 | 6265 | 5301 | 4594 | 4054 | 3627 | 3281 |
| 11900 | | | | | 7722 | 6318 | 5346 | 4633 | 4088 | 3658 | 3309 |
| 12100 | | | | | 7852 | 6424 | 5436 | 4711 | 4157 | 3719 | 3365 |
| 12400 | | | | | 8046 | 6583 | 5570 | 4828 | 4260 | 3811 | 3448 |
| 12500 | | | | | 8111 | 6636 | 5615 | 4867 | 4294 | 3842 | 3476 |
| | | | | | | | |
| 12800 | | | | | 8306 | 6796 | 5750 | 4983 | 4397 | 3934 | 3560 |
| 13200 | | | | | | 7008 | 5930 | 5139 | 4535 | 4057 | 3671 |
| 14000 | | | | | | 7433 | 6289 | 5451 | 4809 | 4303 | 3893 | 3554 |
| 14500 | | | | | | 7698 | 6514 | 5645 | 4981 | 4457 | 4032 | 3682 |
| 14600 | | | | | | 7751 | 6559 | 5684 | 5015 | 4488 | 4060 | 3707 |
| 15000 | | | | | | 7964 | 6738 | 5840 | 5153 | 4610 | 4171 | 3809 |
| 15400 | | | | | | 8176 | 6918 | 5996 | 5290 | 4733 | 4283 | 3910 |

I claim:

1. A lens for sunglasses to be worn by a wearer, comprising
   a light transmissive substrate constituting the lens body, and having a first side for facing the wearer and a second side of facing outwardly from the wearer,
   a semireflective layer intimately bonded to the second side, and
   a dielectric layer over said semireflective layer, said dielectric layer being of substantially uniform thickness,
   the reflectance of said semireflective layer and the thickness of said dielectric layer producing, at one or more wavelengths, a differential effect in intensity, of reflected light incident upon said lens from the direction faced by said second side, by interference between incident light reflected from said dielectric layer and light transmitted through said dielectric layer and reflected from said smireflecting layer, said differential effect altering the spectral distribution of light in an amount for producing a vivid colored appearance formed by said two layers when viewing toward the wearer from the direction faced by said second side.

2. A lens according to claim 1, wherein said semireflecting layer is a metal layer having a reflectance under approximately 30%.

3. A lens according to claim 2, wherein said metal layer has a red-enhanced reflection spectrum.

4. A lens according to claim 1, wherein said dielectric layer has a thickness under one and a half microns.

5. A lens according to claim 1, wherein said differential effect at said one or more wavelengths is between 20% and 500%.

6. A lens according to claim 5, wherein said light transmissive substrate is a shading material which absorbs sufficient light for reducing the intensity of light incident from the viewer side and transmitted through said substrate and semireflective layer to less than the intensity of light incident from the direction of said second side and reflected from said semireflective layer.

7. A lens according to claim 1, wherein said lens body is constituted by a substrate formed of a single optically homogeneous light transmissive material.

8. Sunglasses, of the type having a lens for attenuating light traveling through the lens to the eye of a wearer, wherein the lens comprises a light transmissive substrate constituting the lens body, and having a first side for facing the wearer and a second side for facing outwardly from the wearer, a semireflective layer having a first thickness and being intimately bonded to the second side, and a dielectric layer over said semireflective layer, said dielectric layer having a second, substantially, uniform, thickness, the first thickness determining the reflectance of said semireflective layer and the second thickness determining an interference of said dielectric layer, said first and second thicknesses being selected for producing, at one or more wavelengths, a differential effect in intensity, of reflected light incident upon said lens from the direction faced by said second side, by interference between incident light reflected from said dielectric layer and light transmitted through said dielectric layer and reflected from said semireflecting layer, said differential effect altering the spectral distribution of light in an amount for producing a vivid colored appearance when viewing toward the wearer from the direction faced by said second side.

* * * * *

REEXAMINATION CERTIFICATE (3554th)

United States Patent [19]

King

[11] B1 5,054,902

[45] Certificate Issued Jun. 23, 1998

[54] LIGHT CONTROL WITH COLOR ENHANCEMENT

[76] Inventor: William J. King, 9 Putnam Rd., Reading, Mass. 01867

Reexamination Request:
No. 90/004,651, Jun. 2, 1997

Reexamination Certificate for:
Patent No.: 5,054,902
Issued: Oct. 8, 1991
Appl. No.: 430,080
Filed: Nov. 1, 1989

Related U.S. Application Data

[63] Continuation of Ser. No. 921,312, Oct. 21, 1986, abandoned, which is a continuation of Ser. No. 223,840, Jan. 9, 1981, abandoned, which is a continuation of Ser. No. 645,262, Dec. 29, 1975, abandoned.

[51] Int. Cl.$^6$ .............................. G02C 7/10; G02B 5/28; G02B 1/10
[52] U.S. Cl. .................... 351/44; 351/163; 359/359; 359/360; 359/580; 359/589
[58] Field of Search ...................... 351/44, 48, 163, 351/47; 359/359, 360, 580, 589; 350/164, 165, 166, 1.6

[56] References Cited

U.S. PATENT DOCUMENTS

| | | |
|---|---|---|
| 2,366,687 | 1/1945 | Osterberg . |
| 2,758,510 | 8/1956 | Auwarter . |
| 2,782,676 | 2/1957 | Osterberg . |
| 3,410,625 | 11/1968 | Edwards . |
| 3,679,291 | 7/1972 | Apfel et al. . |

FOREIGN PATENT DOCUMENTS 947339  8/1956  Germany .

*Primary Examiner*—Hung X. Dang

[57] ABSTRACT

A semi-reflecting layer is deposited on a transparent material as part of a technique for color enhancement in such a way that the reflectivity of the semi-reflecting layer may still be varied in order to control transmission of light and portions of the electromagnetic spectrum thereto over a broad range of frequencies. For purposes of color enhancement there is used in conjunction with the semi-reflecting layer a thin dielectric layer the thickness whereof is selected to make use of optical interference between light reflected from the outer surface of the dielectric layer and light reflected from the semi-reflecting layer.

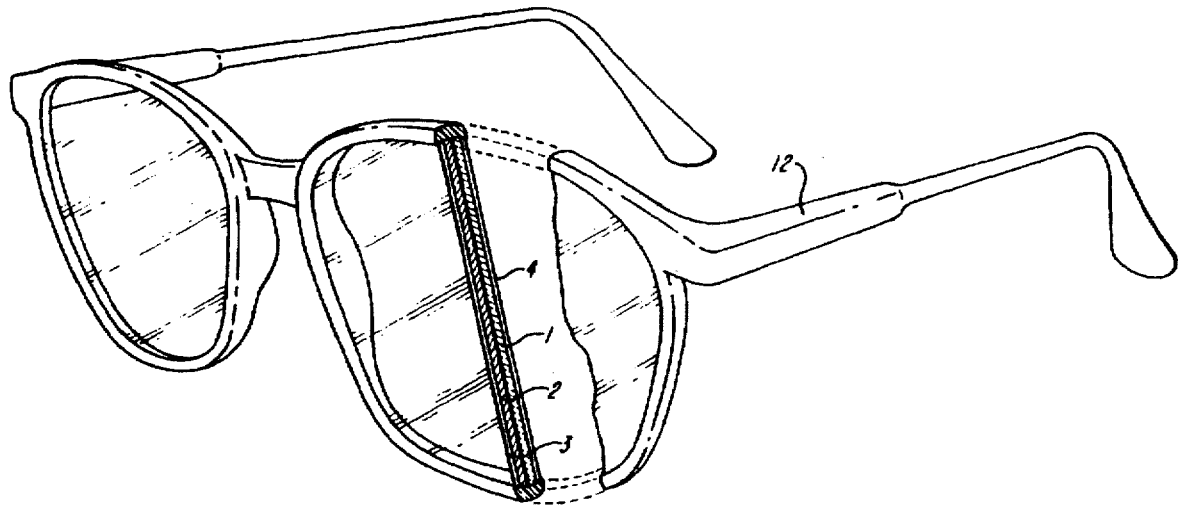

B1 5,054,902

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 8 is confirmed.

Claims 1 and 2 are determined to be patentable as amended.

Claims 3-7, dependent on an amended claim, are determined to be patentable.

New claims 9-39 are added and determined to be patentable.

1. A lens for sunglasses to be worn by a wearer, comprising
    a light transmissive substrate constituting the lens body, and having a first side for facing the wearer and a second side of facing outwardly from the wearer,
    a semireflective layer intimately bonded to the second side, and
    a dielectric layer over said semireflective layer, said dielectric layer being of substantially uniform thickness,
    the reflectance of said semireflective layer and the thickness of said dielectric layer producing, at one or more wavelengths, a differential effect in intensity, of reflected light incident upon said lens from the direction faced by said second side, by interference between incident light reflected from said dielectric layer and light transmitted through said dielectric layer and reflected from said [smireflecting] *semireflective* layer, said differential effect altering the spectral distribution of light in an amount for producing a vivid colored appearance formed by said two layers when viewing toward the wearer from the direction faced by said second side.

2. A lens according to claim 1, wherein said [semireflecting] *semireflective* layer is a metal layer having a reflectance under approximately 30%.

*9. A lens according to claim 5, wherein said semireflective layer is a metal layer.*

*10. A lens according to claim 9, wherein said semireflective layer has a reflectance under approximately 30%.*

*11. A lens according to claim 10, wherein said semireflective layer has a reflectance under approximately 20%.*

*12. A lens according to claim 5, further comprising at least one additional layer over said dielectric layer.*

*13. A lens according to claim 12, consisting essentially of said substrate, said semireflective layer, said dielectric layer, and said additional layer.*

*14. A lens according to claim 5, wherein said lens reflects about 20% to 50% of visible light and greater than about 70% of infrared light.*

*15. A lens according to claim 5, wherein said lens reflects a greater amount of light having wavelengths in the range of 8,000 Å to 25,000 Å than visible light.*

*16. A lens according to claim 5, wherein the thickness of said dielectric layer is such that less than three orders of constructive interference are combined with less than three orders of destructive interference.*

*17. A lens according to claim 1, wherein the semireflective layer has a red-enhanced reflection spectrum.*

*18. A lens according to claim 1, further comprising a protective film over said dielectric layer.*

*19. A lens according to claim 1, wherein said lens reflects about 20% to 50% of visible light and greater than about 70% of infrared light.*

*20. A lens according to claim 1, wherein said lens reflects a greater amount of light having wavelengths in the range of 8,000 Å to 25,000 Å than visible light.*

*21. A lens according to claim 1, wherein said differential effect results from combining less than three orders of constructive interference with less than three orders of destructive interference.*

*22. Sunglasses according to claim 8, wherein the semireflecting layer of said lens is a metal layer having a reflectance under approximately 30%.*

*23. Sunglasses according to claim 8, wherein said metal layer has a red-enhanced reflection spectrum.*

*24. Sunglasses according to claim 8, wherein the dielectric layer of said lens has a thickness under one and a half microns.*

*25. Sunglasses according to claim 8, wherein said differential effect at said one or more wavelengths is between 20% and 500%.*

*26. Sunglasses according to claim 25, wherein said light transmissive substrate is a shading material which absorbs sufficient light for reducing the intensity of light incident from the viewer side and transmitted through said substrate and said semireflective layer to less than the intensity of light incident from the direction of said second side and reflected form said semireflective layer.*

*27. Sunglasses according to claim 26, wherein said substrate forms said lens body with a single optically homogeneous light transmissive material.*

*28. Sunglasses according to claim 25, wherein said semireflective layer is a metal layer.*

*29. Sunglasses according to claim 25, wherein said semireflective layer has a reflectance under approximately 30%.*

*30. Sunglasses according to claim 25, wherein said semireflective layer has a reflectance under approximately 20%.*

*31. Sunglasses according to claim 25, further comprising a protective film over said dielectric layer.*

*32. Sunglasses according to claim 31, wherein the lens consists essentially of said substrate, said semireflective layer, said dielectric layer, and said protective film.*

*33. Sunglasses according to claim 25, wherein said semireflective layer reflects about 20% to 50% of visible light and greater than about 70% of infrared light.*

*34. Sunglasses according to claim 25, wherein said semireflective layer reflects a greater amount of light having wavelengths in the range of 8,000 Å to 25,000 Å than visible light.*

*35. Sunglasses according to claim 25, wherein said differential effect results from combining less than three orders of constructive interference with less than three orders of destructive interference.*

*36. Sunglasses according to claim 8, further comprising at least one additional layer over said dielectric layer.*

37. Sunglasses according to claim 8, wherein the lens reflects about 20% to 50% of visible light and greater than about 70% of infrared light.

38. Sunglasses according to claim 8, wherein said semi-reflective layer reflects a greater amount of light having wavelengths in the range of 8,000 Å to 25,000 Å than visible light.

39. Sunglasses according to claim 8, wherein said second thickness of said dielectric layer differential effect is such that less than three orders of constuctive interference are combined with less than three orders of destructive interference.

* * * * *